March 25, 1952     D. S. ROSENBERG     2,590,651
AFTER-CHLORINATION OF POLYVINYL CHLORIDE
Filed June 6, 1949
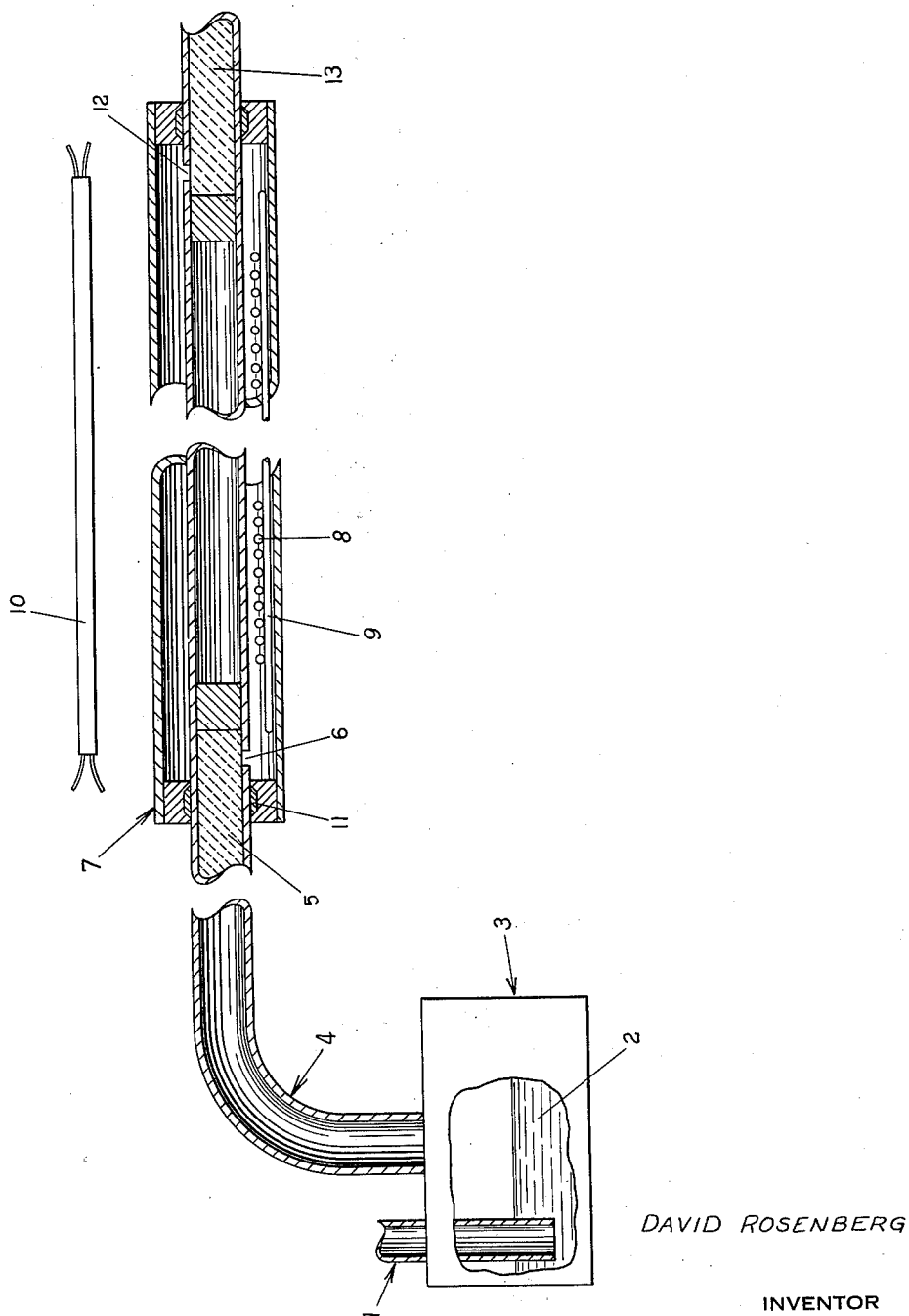
DAVID ROSENBERG
INVENTOR
BY Dean Laurence
ATTORNEY

UNITED STATES PATENT OFFICE 2,590,651

AFTER-CHLORINATION OF POLYVINYL CHLORIDE

David S. Rosenberg, Niagara Falls, N. Y., assignor to Hooker Electrochemical Company, Niagara Falls, N. Y., a corporation of New York Application June 6, 1949, Serial No. 97,366

13 Claims. (Cl. 204—163)

This invention relates to the chlorination of polymers and copolymers of vinyl chloride.

Heretofore, a polyvinylchloride has been after-chlorinated by processes which require large amounts of inert solvents for the polyvinylchloride, in order to render the material susceptible to further chlorination and to enable the production of a product having uniform characteristics. In these processes, the products produced must be separated from the solvent in a suitable physical form and dried. This involves several operating steps, in many pieces of large volume equipment.

It is an object of this invention to provide a process for after-chlorination of polymers and copolymers of vinyl chloride which does not require the use of solvent for the polymer in order to obtain chlorinated products of uniform characteristics. Another object of the present invention is to provide a process for the chlorination of polyvinylchloride in which water and light are the reaction promotors and in which the desired products may be produced in a simple and efficient manner. Other objects will become apparent hereinafter.

The invention comprises: reacting, in the presence of actinic radiation, water-laden chlorine gas with substantially dry powdered polymer or copolymer of vinyl chloride having a controlled particle size. The amount of water which the chlorine carries is critical to the present process, since the yield of desired product is low if insufficient water is present, and, if an excess of water is present, condensation of the sides of the reactor occurs, producing coagulation of the powdered polyvinylchloride, non-uniform chlorination, and corrosion of metal equipment. The size of the particles of polyvinylchloride that is to be treated is also critical and should be less than one millimeter. That is, the particles should be of such size that approximately one hundred percent of the particles used in the chlorination will pass a Tyler standard screen having 16 meshes per lineal inch. However, a preferred embodiment of the present invention contemplates the use of particles which will pass a screen having 42 meshes to the lineal inch.

In the practice of the present invention, it is essential that all the water introduced with the chlorine be continuously removed from the reaction zone at about the same rate as it is introduced. The amount of water carried through the reaction zone will be dependent upon the reaction temperature. A critical step in my procedure involves controlling and insuring the contact of chlorine gas with water at a temperature below the temperature in the reaction zone. This can conveniently be done by passing chlorine gas through water maintained at a temperature somewhat below the temperature of the reaction zone and continuously charging this water-laden chlorine into the reaction zone at a controlled rate. The temperature at which the chlorine gas is saturated with water should be at least 20 centigrade degrees lower than the temperature of the reaction zone. This insures that the water present in the reaction zone will be in the vapor phase and also insures that an excess of water will not be present which would cause the coagulation and condensation of the polyvinylchloride particles and avoids corrosion of the reaction vessel. The minimum amount of water necessary in the chlorine to catalyze the chlorination is about one-tenth of one percent by weight of the chlorine fed. A preferred embodiment of this invention contemplates using water-laden chlorine containing 0.5 to 1.5 percent by weight of water. Optimum results may be obtained by using chlorine containing 0.9 percent by weight of water.

A temperature between approximately fifty and approximately 150 degrees centigrade in the reaction zone is essential in order that homogenous and uniform products may be obtained. Temperatures between sixty and 120 degrees centigrade are preferred and temperatures between eighty and 110 degrees centigrade are optimum.

The range of products obtainable by the process of the present invention, contain up to approximately 71 percent chlorine and have a chain length up to that of the starting material. The solubility characteristics and the softening point of the products will depend on the nature of the starting material, the chlorinating conditions used and the chlorine content of the final product. The after chlorinated polyvinylchloride products produced according to this invention will give clear solutions in tetrahydrofuran. The softening point of said products may vary between 110 degrees centigrade and 210 degrees centigrade.

It is critical that sufficient light having the proper wave length be present to catalyze the reaction. Any source of actinic radiation having a wave length between 2,000 and 5,000 Angstrom units may be used, but light which is essentially between 3,000 and 4,000 Angstrom units is preferred.

The reaction may be conducted in a reactor which is preferably rotated to insure that homogenous chlorination will be obtained throughout all of the particles. Baffles may be inserted in the reaction zone to insure that ample mixing of the particles occurs; however, the baffles may be omitted and alternative conventional means for effecting mixing may be adopted.

The starting materials which are especially suitable for successful chlorination by the process of the present invention are polyvinylchloride and copolymers of vinyl chloride containing either vinylidene chloride or vinyl acetate. However, this invention contemplates, as starting materials, granular polymers which are in a finely divided state and remain substantially solid throughout the entire chlorination period such as polythene, polystyrene, copolymers of styrene and butadiene, and acrylic resins.

The annexed drawing illustrates diagrammatically one type of reactor wherein the process of the present invention may be conducted.

Referring to said drawing: In effecting the after chlorination of polyvinylchloride in a reactor such as is represented in the drawing, chlorine gas is passed through a tube 1, into a body of water 2, maintained at a controlled temperature, in a suitable tank 3. The water-laden chlorine gas is charged from or is drawn off the surface of the water and passed through a tube 4 containing a plug-contained glass wool filter 5, and thence through an orifice 6 into a rotary reactor 7. Polyvinylchloride 8 having a size such that one hundred percent of the particles used will pass through a 42 mesh screen is placed in the tubular reactor 7 and a glass baffle rod 9 inserted therein. A source of actinic light having a substantial percentage of the radiation of the wave length between 3,000 and 4,000 Angstrom units is located so as to irradiate the polyvinylchloride 8. The reactor 7 is maintained at a temperature by means not shown and is journalled on packed bearings 11, while a mixture of chlorine and hydrogen chloride gas is drawn off through orifice 12 at the opposite end from the chlorine inlet orifice 6, through a glass wool filter 13 in an extension of the chlorine tube 14, thereafter vented from the reaction apparatus.

If complete chlorination is desired, the heating is continued until the vented gas drawn off 14 is substantially chlorine with the percentage of hydrogen chloride coming off below about 0.1 percent.

The following example is given to illustrate the practice of the present invention but it is not to be construed as limiting.

*Example*

A reactor similar to that shown in the drawing was charged with 75 grams of high molecular weight polyvinyl chloride of 56.7 percent chlorine content, formed by emulsion polymerization, of a size such that fifty percent was retained on a 200-mesh screen and one hundred percent of the particles passed a 42-mesh screen. The reactor was illuminated with a 40-watt ultraviolet light and the charge heated to fifty degrees centigrade. Chlorine, which had been saturated with water at 25 degrees centigrade (0.9 percent water by weight) was introduced at such a rate that the exit gas was essentially hydrogen chloride gas. After fifteen minutes, the reaction temperature was raised to seventy degrees centigrade. An appreciable rate of hydrogen chloride evolution was observed during the first fifteen minutes of reaction. However, after the first one-half hour, the reaction rate had dropped considerably. The temperature was thereafter raised to eighty degrees centigrade and held at eighty degrees centigrade for a half hour. After 45 minutes, an appreciable reduction in rate of reaction was observed. After an hour had passed, the temperature was raised to ninety degrees centigrade and after an hour and fifteen minutes, raised to one hundred degrees centigrade. The temperature was kept at one hundred degrees centigrade for one hour and 45 minutes (total time three hours). Thereafter, the charge was blown with air and traces of hydrogen chloride and chlorine were neutralized by passing ethylene oxide through the reactor. The charge was then cooled and removed as a white powder, identical in appearance with the initial charge. The product contained 67 percent chlorine, had an average chain length coresponding to 73 percent of that of the starting material, was soluble in acetone to the extent of nine percent and softened at 165 degrees centigrade. The thermal stability of this product and the chain length were much higher than the product obtained when polyvinylchloride is chlorinated using swelling agents and solvents.

The essential elements of the present invention are that the size of the powder be such that there are no particles larger than one millimeter in diameter and such that none of the particles used is retained on a 16 mesh screen. Furthermore, the process of carburetion is critical since it allows the use of a solid reaction phase thereby obviating certain separation and purification steps. If these critical features are observed, a substantially uniform product may be obtained.

Various modifications may be made in the method or apparatus of the present invention without departing from the spirit or scope thereof, and it is to be understood that I limit myself only as defined in the appended claims.

I claim:

1. In a process for the after-chlorination of polymers of vinyl chloride, including contacting comminuted polyvinyl chloride in the form of a dry powder of less than one millimeter of particle size with chlorine gas in a reaction zone maintained at a temperature between 50 and 150 degrees centigrade while exposed to actinic radiation, the step of: adding between 0.1 percent and 1.5 percent water-vapor to said chlorine gas before introduction into said reaction zone, and withdrawing said water-vapor from said reaction zone at substantially the rate it is introduced.

2. The process of claim 1, wherein the particles used have an average size between about 0.2 and 0.6 millimeter.

3. The process of claim 1, wherein the particles used have an average size of about 0.35 millimeter.

4. The process of claim 1, wherein the reaction temperature is maintained between approximately 60 and 120 degrees centigrade.

5. The process of claim 1, wherein the reaction temperature is maintained between approximately 80 to 110 degrees centigrade.

6. The process of claim 1, wherein the chlorine gas contains approximately 0.9 percent water-vapor.

7. A process for the after-chlorination of polyvinyl chloride, which includes: contacting chlorine gas and water-vapor so as to introduce between 0.1 percent and that amount of water-vapor which the chlorine gas will carry at a temperature 20 centigrade degrees below the temperature employed in the reaction zone; contacting such water-vapor-carrying chlorine gas, in the presence of actinic radiation and at a reaction zone temperature between 50 and 150 degrees centigrade, with comminuted polyvinyl chloride in the form of a dry powder of less than one millimeter of particle size; and, withdrawing watervapor from the reaction zone at substantially the rate it is introduced.

8. The process of claim 7, wherein the particles used have an average size between about 0.2 and 0.6 millimeter.

9. The process of claim 7, wherein the particles used have an average size of about 0.35 millimeter.

10. The process of claim 7, wherein the reaction temperature is maintained between approximately 60 and 120 degrees centrigrade.

11. The process of claim 7, wherein the reaction temperature is maintained between approximately 80 and 110 degrees centigrade.

12. The process of claim 7, wherein the chlorine gas contains approximately 0.9 percent water.

13. In a process for the after-chlorination of polyvinyl chloride, including contacting comminuted polyvinyl chloride in the form of a dry powder having an average particle size of 0.35 millimeter with chlorine gas in a reaction zone maintained at a temperature between 80 and 110 degrees centigrade while exposed to actinic radiation, the step of: adding about 0.9 percent watervapor to said chlorine before introduction into said reaction zone, and withdrawing said watervapor from said reaction zone at substantially the rate it is introduced.

DAVID S. ROSENBERG.

REFERENCES CITED

The following references are of record in the file of this patent:

UNITED STATES PATENTS

| Number | Name | Date |
|---|---|---|
| 2,426,080 | Chapman | Aug. 19, 1947 |

FOREIGN PATENTS

| Number | Country | Date |
|---|---|---|
| 215,151 | Switzerland | Sept. 1, 1941 |